United States Patent [19]

Mueller et al.

[11] Patent Number: 4,870,113

[45] Date of Patent: Sep. 26, 1989

[54] RIGID POLYPHOSPHAZENE FOAM AND PROCESS FOR MAKING SAME

[75] Inventors: Warren B. Mueller; Susan D. Landry, both of Baton Rouge, La.

[73] Assignee: Ethyl Corporation, Baton Rouge, La.

[21] Appl. No.: 290,501

[22] Filed: Dec. 23, 1988

[51] Int. Cl.$^4$ .............................. C08J 9/10; C08J 9/36
[52] U.S. Cl. ...................................... 521/89; 264/45.3; 264/54; 264/DIG. 5; 156/308.2; 521/93; 521/95; 521/180; 521/189; 521/918
[58] Field of Search ................... 521/89, 93, 95, 180, 521/189, 918; 156/308.2; 264/45.3, 54, DIG. 5

[56] References Cited

U.S. PATENT DOCUMENTS

| | | | |
|---|---|---|---|
| 3,515,688 | 6/1970 | Rose | 260/2 |
| 3,700,629 | 10/1972 | Reynard et al. | 260/47 P |
| 3,702,833 | 11/1972 | Rose et al. | 260/2 P |
| 3,838,073 | 9/1974 | Rose et al. | 260/2 P |
| 3,843,596 | 10/1974 | Kyker et al. | 260/2 P |
| 3,844,983 | 10/1974 | Reynard et al. | 260/2 P |
| 3,853,794 | 12/1974 | Reynard et al. | 260/2 P |
| 3,883,451 | 5/1975 | Reynard et al. | 260/2 P |
| 3,888,799 | 6/1975 | Rose et al. | 260/2 P |
| 3,888,800 | 6/1975 | Allcock | 260/2 P |
| 3,896,058 | 7/1975 | Reynard et al. | 260/2 P |
| 3,943,088 | 3/1976 | Kyker et al. | 260/2 P |
| 3,948,820 | 4/1976 | Reynard et al. | 260/2 P |
| 3,970,533 | 7/1976 | Kyker et al. | 260/2 P |
| 3,972,841 | 8/1976 | Cheng et al. | 260/2 P |
| 3,994,838 | 11/1976 | Thompson et al. | 521/189 |
| 4,006,125 | 2/1977 | Reynard | 260/2 P |
| 4,026,838 | 5/1977 | Dieck et al. | 260/2 P |
| 4,055,520 | 10/1977 | Dieck et al. | 521/189 |
| 4,055,523 | 10/1977 | Dieck et al. | 260/2 P |
| 4,107,108 | 8/1978 | Dieck et al. | 521/85 |
| 4,116,785 | 9/1978 | Cheng | 528/399 |
| 4,123,503 | 10/1978 | Snyder et al. | 423/300 |
| 4,128,710 | 12/1978 | Fieldhouse et al. | 528/168 |
| 4,129,529 | 12/1978 | Fieldhouse et al. | 528/168 |
| 4,189,413 | 2/1980 | Mitchell et al. | 521/50 |
| 4,536,520 | 8/1985 | Mueller | 521/180 |

*Primary Examiner*—Morton Foelak
*Attorney, Agent, or Firm*—Philip M. Pippenger

[57] ABSTRACT

Low density rigid foamed polyphosphazene articles having excellent physical and flammability properties are made by masticating a mixture of high molecular weight linear polyphosphazene, a curing agent (e.g., sulfur), an accelerator, a blowing agent and optionally fillers, processing aids and the like to form a substantially homogeneous blend and then stopping the masticating, heating to pre-cure and then heating to activate the blowing agent and complete the cure thereby forming a flexible foamed polyphosphazene composite, forming the flexible foamed polyphosphazene composition into a shaped composition, and thereafter heating the flexible foamed shaped polyphosphazene composition at a temperature and for a length of time which causes the flexible foamed polyphosphazene composition to become a rigid foamed polyphosphazene composition of the same shape as the flexible foamed polyphosphazene composition.

17 Claims, No Drawings

RIGID POLYPHOSPHAZENE FOAM AND PROCESS FOR MAKING SAME

BACKGROUND

Cellular plastics have been available for many years. One of the first of such materials was cellular rubber dating to the 1910-1920 period. Subsequently, cellular compositions were made from latex, phenol-formaldehyde resins, urea-formaldehyde resins, PVC, polyurethane, cellulose acetate, polystyrene, polyethylene, epoxides, ABS resins, silicones and very recently polyphosphazenes. Polyphosphazene foams have very desirable properties in that they are highly fire resistant and when subjected to direct flame do not produce toxic smoke which is encountered with many other common foamed materials, notably, polyurethanes.

Polyphosphazenes are polymers containing a plurality of

groups wherein substituents are bonded to phosphorus. The polyphosphazenes which are the concern of this invention are high molecular weight linear polyphosphazenes containing 50 or more of the above units and having molecular weights from about 10,000 up to about 5,000,000 or higher. They are substantially linear and have little, if any, cross-linking. In general, they are soluble in benzene, toluene, cyclohexane and tetrahydrofuran and are relatively insoluble in linear aliphatic hydrocarbons such as hexane or heptane. Groups substituted on phosphorus include phenoxy, alkylphenoxy, alkoxyphenoxy, aminoalkylphenoxy, alkylaminoalkylphenoxy, dialkylaminoalkylphenoxy, halophenoxy (e.g., para-chlorophenoxy, meta-bromophenoxy, trifluorophenoxy and the like), haloalkylphenoxy (e.g., trifluoromethylphenoxy), alkoxy, haloalkoxy (e.g., trifluoroethoxy), alkenylphenoxy (e.g., ortho-allylphenoxy and the like).

Methods of making cellular polyphosphazenes are known. Various procedures are described in U.S. Pat. Nos. 4,026,838; 4,055,520; 4,055,523; 4,107,108; 4,189,413; 4,536,520 and others. In general, the foams are made by mixing the polyphosphazene gum, a blowing agent and a peroxide or sulfur-type curing agent and heating the blended components to activate the blowing agent and cure the resultant foam.

Because these foams are widely recognized to possess the excellent flammability properties required for demanding applications such as pipe insulation and cushions, they have become items of considerable commercial significance. However, due to their flexible elastomeric nature they are potentially unsuitable for many foam-specific applications which require good thermal insulating materials having excellent flammability properties, but depend on a rigid foam to achieve the desired end-use performance as in the case of rigid pipe insulation, for example, where a flexible insulation would not take the compressive loads imposed by the application design or in the case of composite core material for use in aircraft, marine and aerospace applications. Also, it would be highly desirable if such a rigid polyphosphazene foam could be produced in a wide variety of shapes including rigid slabstock foam sheets and pipe insulation having varying degrees of curvature or complex contours to accommodate specific end uses. In response to this need, there is now provided a low density rigid polyphosphazene foam having excellent flammability and compression resistant properties which can be produced in a wide variety of shapes and designs.

SUMMARY OF THE INVENTION

The process by which the rigid cellular polyphosphazene foams of the present invention are made utilizes flexible polyphosphazene foam as a precursor allowing for an extremely wide variety of shaped rigid foamed articles to be produced therefrom. In accordance with the process, a flexible elastomeric polyphosphazene foam is first made by forming a composition comprising a substantially linear high molecular weight polyphosphazene gum, a curing agent, a blowing agent and optionally a plasticizer, an inorganic filler, an accelerator and processing aids. The composition is masticated or mixed until it forms a substantially homogeneous blend whereupon mixing is stopped. The resultant composition is shaped into conventional slabs or sheets or is extruded into a hollow cylindrical form prior to curing and then heated in an unconfined environment to a temperature which activates the blowing agent causing the composition to expand into a foamed composition and completing the cure of the foamed composition to produce a flexible elastomeric foamed polyphosphazene composition. Optionally, the shaped composition can be pre-cured prior to curing. That is, the shaped composition or homogenous blend can be aged at a temperature above the predetermined maximum mixing temperature but below the activation temperature of the blowing agent. This operation causes a limited amount of crosslinking to occur raising the viscosity of the composition such that the blowing gas does not escape during the blowing operation. This step is usually done in a pre-cure oven. After curing, while the foamed material is flexible, it can easily be re-shaped into a variety of configurations and designs and processed into a rigid foam having a specific shape by heating the shaped flexible polyphosphazene foamed material to a temperature and for a length of time sufficient to cause the shaped flexible composition to become rigid. By this process, rigid foamed sheets, slabs, pipes and the like having varying degrees of curvature or complex contours possessing excellent compression resistant and flammability properties can be produced.

DESCRIPTION OF PREFERRED EMBODIMENTS

Thus, a preferred embodiment of the invention is a process for making a low density rigid polyphosphazene foam having excellent flammability and compression resistant properties, said process comprising:
 (i) forming a composition comprising a substantially linear high molecular weight polyphosphazene gum, a curing agent, a blowing agent and optionally a plasticizer, an inorganic filler, an accelerator and processing aids,
 (ii) masticating said composition to form a substantially homogeneous blend, and then stopping said masticating,
 (iii) heating said composition in an unconfined environment to a temperature which activates said blowing agent causing said composition to expand into a foamed composition and completing cure of said foamed composition thereby forming a flexible foamed polyphosphazene composition, (iv) forming said flexible foamed polyphosphazene composition into a shaped composition, and thereafter (v) heating said flexible foamed shaped polyphosphazene composition at a temperature and for a length of time sufficient to cause said flexible shaped foamed polyphosphazene composition to become a rigid foamed polyphosphazene composition having the same shape as said flexible foamed polyphosphazene composition.

Since the invention also contemplates low density foamed shaped rigid polyphosphazene compositions having excellent flammability and compression resistant properties made by the process of the invention as aforedescribed, another embodiment of the invention is a low density foamed shaped rigid polyphosphazene composition made by a process comprising:

(i) forming a composition comprising a substantially linear high molecular weight polyphosphazene gum, a curing agent, a blowing agent and optionally a plasticizer, an inorganic filler, an accelerator and processing aids, (ii) masticating said composition to form a substantially homogeneous blend, and then stopping said masticating, (iii) heating said composition in an unconfined environment to a temperature which activates said blowing agent causing said composition to expand into a foamed composition and completing cure of said foamed composition thereby forming a flexible foamed polyphosphazene composition, (iv) forming said flexible foamed polyphosphazene composition into a shaped composition, and thereafter (v) heating said flexible foamed shaped polyphosphazene composition at a temperature and for a length of time sufficient to cause said flexible shaped foamed polyphosphazene composition to become a low density foamed shaped rigid polyphosphazene composition having the same shape as said flexible foamed polyphosphazene composition.

High molecular weight linear polyphosphazenes are known polymers. Their preparation is described in the literature and in patents such as U.S. Pat. Nos. 3,515,688; 3,700,629; 3,702,833; 3,838,073; 3,843,596; 3,844,983; 3,853,794; 3,883,451; 3,888,799; 3,888,800; 3,896,058; 3,943,088; 3,948,820; 3,970,533; 3,972,841; 3,994,838; 4,006,125; 4,116,785; 4,123,503; 4,128,710 and 4,129,529.

In general, linear polyphosphazenes consist essentially of

in which n can range from about 50 to 50,000 or more and wherein any of a large number of groups can be substituted on phosphorus. Substituent groups can include alkoxy, substituted alkoxy such as haloalkoxy or alkoxyalkoxy, aryloxy, substituted aryloxy wherein the substituents can be alkyl, alkoxy, halo, alkenyl, haloalkyl, amino, alkylamino, dialkylamino and the like.

Other phosphorus substituents can be halogen (e.g., chlorine), alkenoxy and the like.

In developing the present invention, excellent results have been achieved using polyphosphazene in which the substituents were a random mixture of phenoxy, para-ethylphenoxy and ortho-allylphenoxy groups. The ortho-allylphenoxy groups impart curing properties to the polyphosphazene gum. A preferred ratio is about 30–60 mole percent phenoxy, 30–60 mole percent paraethylphenoxy and 1–20 mole percent ortho-allylphenoxy.

In making a foam, the polyphosphazene gum is first blended with other ingredients to give a formulation. An essential component of the formulation is a blowing agent. The amount of blowing agent should be that which will evolve sufficient gas to give a foam of the desired density but not an excessive amount which results in splitting of the foam. Blowing agents decompose to evolve gas upon heating. This decomposition temperature varies over a wide range with different foaming agents. Many foaming agents are azo compounds which evolve nitrogen when undergoing thermal decomposition. Examples of blowing agents include dinitrosopentamethylenetetramine, 4,4'-oxybis(benzenesulfonyl hydrazide), axodicarbonamide, ammonium carbonate, ammonium bicarbonate, sodium bicarbonate, ammonium nitrite, tertbutylamine nitrite, guanidine nitrite, guanylurea nitrite, sodium borohydride, potassium borohydride, urea, biuret, N-nitro urea, diazomaniobenzene, 2,2'-azobis(2-methylpropionitrile), 2,2'-azobisisobutyronitrile, 1,1'-azobiscyclohexanecarbonitrile, azobisisobutyramidoxime, azobisformamide, N,N'-di-tert-butylazobisformamide, N,N'-diphenylazobisformamide, phenylhydrazine, benzylmonohydrozone, benzenesulfonyl hydrazide, methyl carbanilate, 4,4'-oxybis(benzenesulfonyl hydrazide), 3,3'-sulfonylbis(benzenesulfonyl hydrazide), cyanuric trihydrazide, 4,4'-oxybis(benzenesulfonyl semi-carbizide), benzoylazide, p-tertbutylbenzoylazide, diphenyl-4,4'-disulfonyldiazide, N,N'-dimethyl-N,N'-dinitroso terephthalamide and the like.

Curing agents encompass a broad range of compounds which serve to promote cross-linking of the polyphosphazene. One class of curing agents is made up of peroxides. The most important curing agent used to make the present foamed compositions are the sulfur-type curing agents generally referred to as vulcanizing agents. A typical sulfur vulcanizing system comprises sulfur, an accelerator and promoters. Zinc oxide is usually included with the sulfur. Other accelerators include zinc dialkyldithiocarbamates (e.g., zinc dimethyldithiocarbamate, zinc dibutyldithiocarbamate and the like). Other useful accelerators are zinc benzothiazylsulfide, N-cyclohexyl-2-benzothiazylsulfenamide, 4,4'-dithiomorpholine, fatty acids in combination with zinc oxide such as stearic acid, zinc fatty acid salts such as zinc stearate, tetraalkylthiuram monosulfide, tetraalkylthiuram disulfide, 2-benzothiazoyl disulfide, zinc benzothiazolyl mercapto, mercaptobenzothiazole, 2-benzothiazolysulfenamide, amines, diphenyl guanidine, thiobisamines and the like.

Another component that is usually included in polymer foam compositions is a filler. These are usually inorganic materials although some organic materials are used. Examples of fillers are clay, talc, mica asbestos, feldspar, bentonite, wollastonite, fullers earth, pumice, pyrophillite, rottenstone, slate flour, vermiculite, calcium silicate, magnesium silicate, alumina, hydrated alumina, antimony oxide, magnesia, titania, zinc oxide, silica, calcium carbonate, barium carbonate, magnesium carbonate, barium sulfate, calcium sulfate, lime, magnesium hydroxide, carbon black, graphite, metal powders, fibers and whiskers, barium ferrite, magnetite, molybdenum disulfide, glass fibers or flakes, ground glass and the like.

The polyphosphazene formulations which are foamed according to the present invention generally include a plasticizer. These can be liquids which when blended with the polyphosphazene gum and the other components tend to reduce the viscosity of the mass and assist in making a homogenous blend. Useful plasticizers include tricresylphosphate, triphenylphosphate, cresyl-diphenylphosphate, butyl octyl phthalte, dibutyl phthalate, dicyclohexyl phthalate, diisodecyl phthalate, di-2-ethylhexyl phthalate, ditridecyl phthalate, isooctylisodecyl phthalate, diisodecyl adipate, di-2-ethylhexyl adipate, octyldecyl adipate, diisobutyl adipate, diisooctyl adipate, di-2-ethylhexyl azelate, diisodecyl azelate, dibutyl maleate, glycerol ricinoleate, isopropyl myristate, isopropyl palmitate, butyl oleate, glycerol trioleate, methyl oleate, 2-ethylhexyl oleate, dibutyl sebacate, di-2-ethylhexyl sebacate, butyl stearate, 2-ethylhexyl stearate, triethyleneglycol dicaprate, ethylene glycol terephthalate polyesters, diethylene glycol dipelargonate, polyethylene glycol 200 dibenzoate, polyethylene glycol 600 dibenzoate, glycerol triacetyl-ricinoleate, adipic acid glycol polyester 6,000 and the like.

The amount of the different components in the formulation can vary widely based upon parts by weight per 100 parts by weight of polyphosphazene gum. A useful range is given in the following table:

|  | Parts by Weight |
| --- | --- |
| Polyphosphazene gum | 100 |
| Sulfur | 0.5–20 |
| Accelerator | 0.1–5 |
| Blowing agent | 10–50 |
| Filler | 50–300 |
| Plasticizer | 5–50 |

The components in the formulated compositions are then subjected to mechanical mixing or mastication to form a substantially uniform blend. This mixing is conducted in the same type equipment used in compounding rubber prior to vulcanization. Suitable mixing equipment on the laboratory scale is marketed under the trademark "Brabender". Larger mixing equipment is marketed under the "Banbury" trademark. These are heavy duty mixers that crush and masticate the formulation until it forms a homogenous blend.

After the mixing operation, the composition can be shaped into useful forms such as sheets and slabs for use in insulation or cushions, or it can also be extruded into hollow cylindrical forms for use as pipe insulation.

Prior to curing, the shaped composition optionally can be aged at a temperature above the pre-determined maximum mixing temperature but below the activation temperature of the blowing agent. This operation causes a limited amount of cross-linking to occur raising the viscosity of the composition such that the blowing gas does not escape during the blowing operation. This step is usually done in a pre-cure oven. Good results have been achieved when the shaped composition is maintained at a pre-cure temperature of about 100°–20° C. for a period of about 5–20 minutes.

In the next operation, the shaped pre-cured composition is heated in an unconfined environment high enough to activate the blowing agent. The composition then expands forming a flexible cellular polyphosphazene article. The term "unconfined environment" means that there is space available into which the shaped polyphosphazen composition can expand during cell development. As it reaches its final volume it may again be confined in some form or mold.

Because of the flexible nature of the cellular polyphosphazene article thus formed, it can be re-shaped into a variety of geometrical forms and configurations prior to its conversion to a rigid polyphosphazene material. For example, flexible hollow cylindrical tubes can be re-shaped into tubes having varying degrees of curvature or bend or complex contours such as "S" or "L" configurations and the like and processed into rigid tubes of the same configuration or design and used as insulation for pipes of the same shape. In the final step of the process, the shaped flexible elastomeric foamed polyphosphazene is heated to a temperature and for a length of time which is sufficient to transform the flexible, shaped cellular polyphosphazene into a rigid foamed composition of the same shape as the flexible composition. Heating can be effected, for example, by radiation heating (e.g., infra-red or microwave) or by convection heating. Suitable temperatures range from about 75° to 600° C., more preferably 100° to 300° C. with useful heating times varying from about 10 minutes to 25 days, preferably 8 to 24 hours. The time and temperature can be adjusted depending on the geometry and thickness of the flexible article, the degree of rigidity desired and the heating mode. Excellent results have been achieved when the shaped flexible elastomeric polyphosphazene composition is heated to a temperature of about 200° C. for a period of time of about 16 hours.

Thus, another embodiment of the present invention is a shaped article made from a rigid foamed polyphosphazene composition made by the process of the present invention.

A foaming operation was carried out. The following formulation was used:

|  | Parts by Weight |
| --- | --- |
| Polyphosphazene gum | 100 |
| Hydral 710 W[1] | 180 |
| Zinc stearate | 10 |
| Silastic HA-2[2] | 10 |
| Carbowax 3350[3] | 2 |
| Celogen AZ 130[4] | 25 |
| Carbon black | 10 |
| Sulfur | 1.25 |
| Plasticizer[5] | 12 |

[1]Alcoa brand hydrated alumina
[2]Dow-Corning brand of silicon filled methyl vinyl silicone
[3]Union Carbide brand polyethyleneoxide
[4]Naugatuck brand azodicarbonamide
[5]An oil made by substituting trimer with phenoxy, p-ethylphenoxy and O—allylphenoxy groups The polyphosphazene gum was a high molecular weight linear polymer substituted with about 52 mole percent phenoxy, 42 mole percent p-ethylphenoxy and 6 mole percent o-allylphenoxy groups.

The components were blended in a Banbury mixer until a substantially homogeneous blend was obtained.

A curing concentrate was separately formulated as follows:

|  | Parts by Weight |
|---|---|
| Polyphosphazene gum[1] | 100 |
| Hydral 710W[2] | 150 |
| Silastic HA-2[3] | 25 |
| Altax[4] | 23.75 |
| Vanax 552[5] | 50 |
| Butyl Zimate | 12.5 |

[1]High molecular weight linear polymer substituted with about 52 mole percent phenoxy, 42 mole percent p-ethylphenoxy and 6 mole percent o-allylphenoxy groups
[2]Alcoa brand hydrated alumina
[3]Dow-Corning brand of silicon filled methyl vinyl silicone
[4]Vanderbilt brand benzothiazyl desulfide oil modified and treated with 1% zinc stearate
[5]Vanderbilt brand piperidinium pentamethylene dithiocarbamate The above concentrate was mixed in a Banbury mixer at 60 rpm and then in a 2-roll mill. Finally, the first formulation above was placed on one roll of a 2-roll mill and 14.9 parts by weight of the concentrate were randomly dropped into the nip of the 2-roll mill as the blend rotated on one roll. The blend was then cut from the roll and was homogenized by 20 passes through the mill with folding after each pass to form a sheet. The sheet was cut to form a rectangular slab which was placed in a mold. The mold was placed in a pre-cure oven maintained at 103.3° C. which is below the activation temperature of the blowing agent for approximately seventeen minutes and placed in a foaming oven for a twenty-five minute period. The foaming oven was maintained at 160° C. which is above the activation temperature of the foaming agent. The resultant foam was allowed to cool to ambient temperature and then placed into an oven and heated to 200° C. for about 16 hours to produce a rigid low density cellular polyphosphazene foam. Test specimens were prepared from the foam and foam quality, water absorption, compression resistance, density, water vapor permeability, tensile strength, and flexural modulus measurements were obtained on the test specimens. The results are shown in the following Table 1.

TABLE 1

| Foam quality | good |
|---|---|
| Water absorbance (%)[1] | 1379 |
| Compression resistance (lb/in$^2$)[2] | 9.26[3] |
| Density (lb/ft$^3$)[4] | 3.64 |
| Water vapor permeability (perms-in)[5] | .026 |
| Tensile strength (lb/in$^2$)[6] | 17.066[7] |
| Flexural modulus (lb/in$^2$)[8] | 3334.8[9] |

[1]ASTM D 1056 (1 test specimen used instead of 3)
[2]ASTM D 1056 (except deflection was maintained at 25% and the load observed and recorded 60 seconds after 25% deflection was reached)
[3]Average of 5 specimens each having a surface area of 1 inch$^2$ and an average thickness of 0.581 inch
[4]ASTM D 1667
[5]MIL-I-24703 Section 4.6.15 (1 test specimen used instead of 3)
[6]ASTM D 412
[7]Average of 3 specimens each having a thickness of 0.25 inch
[8]ASTM D 790 (3 test specimens used instead of 5)
[9]Average of 3 specimens each having a thickness of 1 inch Flammability properties were also measured for the rigid polyphosphazene foam prepared as described above by measuring test specimens of the foam for acid gas generation, flame spread index, thermal conductivity, specific optical density, rate of heat release and limiting oxygen index. The results are shown in the following Table 2.

TABLE 2

| Acid gas generation (mg-HCl/gm)[1] | 0 |
|---|---|
| Flame spread index[2] | 9.51[3] |
| Thermal conductivity (BTU-in./hr. ft$^2$ F.)[4] | 0.275 |
| Specific optical density[5] | |
| Non-flaming mode | 19.5[6] |
| Flaming mode | 34.5[7] |
| Rate of heat release[8] | |
| Max RHR (kw/m$^2$) | 35.46[9] |
| 2 Min HR (kw-min/m$^2$) | 33.81[10] |
| Max SRR (smk/min,m$^2$) | 22.39[11] |
| Limiting Oxygen Index (%)[12] | >56 |

[1]MIL-I-24703 Section 4.6.18
[2]ASTM E 162
[3]Average of 4 specimens each 6 inches × 18 inches × 1 inch
[4]ASTM C 518
[5]ASTM E 662 (2 test specimens used instead of 3)
[6]Average of 2 test specimens each 3 inches × 3 inches × 0.5 inch
[7]Average of 2 test specimens each 3 inches × 3 inches × 0.5 inch
[8]ASTM E 906
[9]Average of 3 test specimens each 6 inches × 6 inches × 1 inch
[10]Average of 3 test specimens each 6 inches × 6 inches × 1 inch
[11]Average of 3 test specimens each 6 inches × 6 inches × 1 inch
[12]ASTM D 2863 (5 test specimens used instead of 10)

The results demonstrate the excellent flammability properties of this material which include high resistance to ignition, little contribution to flame spread and extremely low levels of smoke generation. Also, the heat release as measured by ASTM E 906 is very low.

In addition to providing for the production of rigid polyphosphazene foamed material of various geometrical shapes and designs, another feature of the present process is that it permits the formation of joint bonds between two or more individual pieces of flexible foam so that when the individual pieces of flexible foam are converted to a rigid foam by the process of the invention, they bond with one another to form a single unitary composite piece of rigid material. For example, the edges of two or more separate pieces of flexible foam can be abutted against each other and heated in accordance with the process of the invention and converted to a unitary composite piece of rigid foam. During the process, a bond forms between the individual pieces of the flexible foam where the edges of the pieces contact one another and a single, unitary composite piece of rigid foam is produced thereby. This has significant practical application in that it allows for several individual pieces or sections of hollow cylindrical flexible foam to be bonded together end to end to form one unitary section of rigid polyphosphazene material which can be used as pipe insulation for exceptionally long sections of pipe. In addition, the present process also can be used to bond two pieces of flexible foam together each having a cut edge with a 45 degree angle to produce a 90 degree piece of rigid foam. This feature of the invention virtually eliminates or reduces the need for the use of conventional adhesives such as solvent-dispersed synthetic rubber resin adhesives to bond separate pieces of foamed materials together which often contribute to smoke generation in a fire situation.

To determine the integrity of the bond formed by the present process, the tensile strength of a bonded piece of rigid foam was measured and compared to that of a single non-bonded piece of rigid foam. An identical formulation as previously described was prepared, placed in a mixing chamber and mixed until a substantially homogeneous blend was obtained. The blended formulation was removed from the mixer and passed between the rolls of a two-roll mill about 20 passes with folding between passes to form a 0.5 cm sheet. The sheet was cut to form a rectangular slab which was placed in a mold. The mold was placed in a pre-cure oven maintained at 103.3° C. which is below the activation temperature of the blowing agent. The slab was then removed from the mold and placed in a foaming oven for a twenty-five minute period. The foaming oven was maintained at 177° C. which is above the activation temperature of the foaming agent. Two strips were cut from the foamed flexible composition each 2.5 inches in length, 0.2 inch in thickness and 1 inch wide and placed end to end with the two ends of the strip touching each other. The strips were then placed in an air circulation oven, heated to 200° C. and maintained at that temperature for 16 hours to convert the individual pieces of flexible foam to a solitary composite rigid foam. The sample was taken out of the oven, allowed to cool to ambient temperature where adhesion between the two foamed pieces was observed to be very good. The tensile strength of the bonded piece of rigid foam was measured by the ASTM D 412 method and found to be approximately 17 psi which is about the same as the tensile strength of the non-bonded rigid foam test specimen reported in Table 1 above.

Thus, another embodiment of the present invention is a method of bonding one piece of cured flexible foamed polyphosphazene elastomer material to at least one other piece of cured flexible foamed polyphosphazene elastomer material to form a single unitary piece of rigid foamed polyphosphazene composite material said process comprising placing said pieces of cured flexible foamed polyphosphazene elastomer material in juxtaposition with and abutting one another and heating said pieces at a temperature and for a length of time sufficient to cause said pieces to bond together and form a single unitary piece of rigid foamed polyphosphazene composite.

We claim:

1. A process for making a low density rigid polyphosphazene foam having excellent flammability and compression resistent properties, said process comprising:
    (i) forming a composition comprising a substantially linear high molecular weight polyphosphazene gum, a curing agent, a blowing agent and optionally a plasticizer, an inorganic filler, an accelerator and processing aids,
    (ii) masticating said composition to form a substantially homogeneous blend, and then stopping said masticating,
    (iii) heating said composition in an unconfined environment to a temperature which activates said blowing agent causing said composition to expand into a foamed composition and completes cure of said foamed composition thereby forming a flexible foamed polyphosphazene composition,
    (iv) forming said flexible foamed polyphosphazene composition into a shaped composition, and thereafter
    (v) heating said flexible foamed shaped polyphosphazene composition at a temperature and for a length of time sufficient to cause said flexible foamed shaped polyphosphazene composition to become a rigid foamed polyphosphazene composition having the same shape as said flexible foamed polyphosphazene composition.

2. A process of claim 1 wherein said polyphosphazene gum is a phenoxy substituted polyphosphazene gum wherein said phenoxy substituents are selected from phenoxy, alkylphenoxy, alkoxyphenoxy, alkenylphenoxy, halophenoxy, alkylaminoalkylphenoxy, dialkylaminoalkylphenoxy, haloalkylphenoxy and mixtures thereof.

3. A process of claim 2 wherein said phenoxy substituents are selected from phenoxy, lower alkyl phenoxy and allylphenoxy.

4. A process of claim 3 wherein said phenoxy substituents are about 30–60 mole percent phenoxy, about 30–60 mole percent para-ethylphenoxy and about 1–20 mole percent ortho-allylphenoxy.

5. A process of claim 2 wherein said substantially homogeneous blend from (ii) is maintained at a pre-cure temperature below the activation temperature of said blowing agent thereby increasing the viscosity of said blend.

6. A process of claim 1 wherein said curing agent comprises sulfur.

7. A process of claim 6 wherein said composition includes an accelerator which is a zinc dialkyldithiocarbamate.

8. A process of claim 6 wherein said blowing agent is a compound that evolves nitrogen upon decomposition.

9. A process of claim 8 wherein said blowing agent is selected from azodicarbonimide, 1,1'-azobisformamide and mixtures thereof.

10. A process of claim 8 wherein said composition includes a zinc fatty acid salt.

11. A process of claim 10 wherein said zinc fatty acid salt is zinc stearate.

12. A process of claim 5 wherein said curing agent comprises sulfur and said substantially homogenous blend from (ii) is maintained at a pre-cure temperature of about 100°–120° C. for a period of about 5–20 minutes and is then heated in an unconfined environment to a temperature which activates said blowing agent causing said blend to expand into a foamed composition and completes curing of said foamed composition.

13. A process of claim 12 wherein said substantially homogenous blend from (ii) includes an accelerator which is a zinc dialkyldithiocarbamate and said blowing agent is selected from azodicarbonimide, 1,1'-azobisformamide and mixtures thereof.

14. A process of claim 13 wherein said substantially homogenous blend from (ii) includes an accelerator.

15. A process of claim 14 wherein said accelerator is a zinc dialkyldithiocarbamate.

16. A process of claim 15 wherein said blowing agent is selected from azodicarbonimide, 1,1'-azobisformamide and mixtures thereof.

17. A process of claim 16 wherein said substantially homogenous blend from (ii) includes a zinc fatty acid salt.

* * * * *

UNITED STATES PATENT AND TRADEMARK OFFICE
CERTIFICATE OF CORRECTION

PATENT NO. : 4,870,113

DATED : September 26, 1989

INVENTOR(S) : Warren B. Mueller, et al

It is certified that error appears in the above-identified patent and that said Letters Patent is hereby corrected as shown below:

Title page:

Abstract [57] line 10, reads "composite" and should read -- composition --

Signed and Sealed this

Twenty-seventh Day of November, 1990

Attest:

HARRY F. MANBECK, JR.

*Attesting Officer*     *Commissioner of Patents and Trademarks*